United States Patent [19]
Lat et al.

[11] Patent Number: 5,741,104
[45] Date of Patent: Apr. 21, 1998

[54] STEEL FASTENER HAVING GROOVED SHANK

[75] Inventors: Geronimo E. Lat, Prospect Heights; William L. Gabriel, Barrington, both of Ill.; Henry A. Sygnator, deceased, late of Sherwood, Wis., by Janet M. Allen, executrix; Henry W. Schniedermeier, Niles; Frederick A. Kish, Wheeling, both of Ill.

[73] Assignee: Illinois Tool Works Inc., Glenview, Ill.

[21] Appl. No.: 869,483

[22] Filed: Jun. 5, 1997

Related U.S. Application Data

[63] Continuation of Ser. No. 651,552, May 22, 1996, abandoned, which is a continuation-in-part of Ser. No. 472,906, Jun. 7, 1995, which is a continuation-in-part of Ser. No. 293,003, Aug. 19, 1994, Pat. No. 5,489,179.

[51] Int. Cl.⁶ .......................... F16B 15/06; F16B 15/08
[52] U.S. Cl. .................. 411/453; 411/456; 411/903; 411/922
[58] Field of Search .................. 411/451, 452, 411/453, 454, 455, 456, 480, 902, 903, 922

[56] References Cited

U.S. PATENT DOCUMENTS

| | | |
|---|---|---|
| 276,541 | 4/1883 | Sloan . |
| 426,008 | 4/1890 | Groff . |
| 1,326,910 | 1/1920 | Butterfield . |
| 1,912,222 | 5/1933 | Rosenberg . |
| 2,075,411 | 3/1937 | Von Mertens . |
| 2,093,610 | 9/1937 | Kraemer . |
| 2,190,883 | 2/1940 | Pauze . |
| 2,269,708 | 1/1942 | Dickson . |
| 2,967,448 | 6/1961 | Hallock . |
| 3,010,353 | 11/1961 | Psaros . |
| 3,019,460 | 2/1962 | Corckran . |
| 3,088,361 | 5/1963 | Hallock . |
| 3,106,791 | 10/1963 | Ball ............................ 36/34 |
| 3,214,875 | 11/1965 | Slowinski et al. ............ 53/364 |
| 3,233,498 | 2/1966 | Handja . |
| 3,568,746 | 3/1971 | Faroni et al. . |
| 3,813,985 | 6/1974 | Perkins . |
| 3,850,073 | 11/1974 | Hayes . |

(List continued on next page.)

FOREIGN PATENT DOCUMENTS

| | | |
|---|---|---|
| 57-35693 | 8/1982 | Japan . |
| 1072609 | 6/1967 | United Kingdom . |

OTHER PUBLICATIONS

*Monozukuri Katai Shinsyo*, pp. 22 and 23, Oct. 20, 1992.
Japanse Patent Public Disclosure No. 4-357313, dated Dec. 10, 1992.
Japanese Utility Model No.57-45446, dated Oct. 6, 1982.
Japanese Patent Publication No. 4-57415, dated Sep. 11, 1992.
Japanese Utility Model No. 15-16699, dated Nov. 6, 1940.
Japanese Utility Model No. 3-54964, dated Dec. 5, 1991.
Japanese Utility Model No. 44-4505, dated Feb. 19, 1969.

*Primary Examiner*—Neill R. Wilson
*Attorney, Agent, or Firm*—Rockey, Milnamow & Katz, Ltd.

[57] ABSTRACT

A steel fastener has an elongate shank, an enlarged head formed at one end of the shank, and a generally pointed tip formed at the other end of the shank. A grooved portion of the shank is formed with helical grooves defining helical ribs and with annular grooves defining annular rings. The shank has a cylindrical portion between the grooved portion and the tip and a cylindrical portion between the grooved portion and the head. Each of the annular grooves has a root where deepest and each of the annular rings has a crest where largest. The roots define an imaginary cone diverging toward the tip. The crests define an imaginary cone converging toward the tip. The shank has an exterior surface coated with a polymeric coating, which is formed from an aqueous composition containing a water-based acrylic resin and a water-based polyurethane resin. A zinc layer and a chromate conversion layer are provided between the polymeric coating and the exterior surface of the shank.

12 Claims, 1 Drawing Sheet

U.S. PATENT DOCUMENTS

| | | | |
|---|---|---|---|
| 3,861,527 | 1/1975 | Perkins | 206/344 |
| 3,977,142 | 8/1976 | Dove et al. | 52/363 |
| 4,664,733 | 5/1987 | Masago | 156/212 |
| 4,718,802 | 1/1988 | Rockenfeller et al. | 411/421 |
| 4,837,090 | 6/1989 | Hyner et al. | 428/626 |
| 4,915,561 | 4/1990 | Buhri et al. | 411/439 |
| 4,932,820 | 6/1990 | Schniedermeier | 411/455 |
| 4,964,774 | 10/1990 | Lat et al. | 411/446 |
| 5,149,237 | 9/1992 | Gabriel et al. | 411/446 |
| 5,261,770 | 11/1993 | Hoepker et al. | 411/441 |
| 5,375,957 | 12/1994 | Golledge | 411/453 |
| 5,441,373 | 8/1995 | Kish et al. | 411/442 |
| 5,489,179 | 2/1996 | Gabriel et al. | 411/453 |

STEEL FASTENER HAVING GROOVED SHANK

This application is a continuation of U.S. patent application Ser. No. 08/651,552, which was filed on May 22, 1996 now abandoned. U.S. patent application Ser. No. 08/651,552 is a continuation-in-part of U.S. patent application Ser. No. 08/472,906, which was filed on Jun. 7, 1995, and the disclosure of which was incorporated by reference in U.S. patent application Ser. No. 08/651,552. U.S. patent application Ser. No. 08/472,906 is a continuation-in-part of U.S. patent application Ser. No. 08/293,003, which was filed on Aug. 19, 1994, now U.S. Pat. No. 5,489,179.

TECHNICAL FIELD OF THE INVENTION

This invention pertains to a steel fastener having a unique configuration along its shank and useful primarily for fastening a workpiece having a given thickness to a metal substrate having a thinner wall and secondarily for fastening such a workpiece to a wooden substrate.

BACKGROUND OF THE INVENTION

Steel fasteners of various configurations are known for fastening relatively thick workpieces, such as boards made of plywood or plasterboard, to various substrates, such as metal framing members, wooden framing members, and wooden underlayments. Commonly, such fasteners have elongate shanks defining axes and are designed to be axially driven by powered tools, such as pneumatically powered tools or combustion-powered tools.

Such a fastener having an elongate shank, an enlarged head at one end of the shank, and a point at the other end of the shank with annular grooves defining annular rings along the shank and with helical grooves defining helical ribs along the shank is exemplified in Japanese Utility Model Publication No. 57-35693 dated Aug. 6, 1982. The annular grooves have roots defining an imaginary cylinder of a given diameter. The annular rings have crests defining an imaginary cylinder of a larger diameter.

Such a fastener having a tapered shank, an enlarged head at one end of the shank, and a point at the other end of the shank with annular grooves defining annular rings along the shank and with helical grooves defining helical ribs along the shank is exemplified in Rockenfeller et al. U.S. Pat. No. 4,718,802. The annular grooves have roots defining an imaginary cone converging toward the point. The annular rings have crests defining an imaginary cone converging toward the point.

An improved fastener having an elongate shank divided by a cylindrical land or cylindrical lands into ringed subportions, an enlarged head at one end of the shank, and a point at the other end of the shank with annular grooves defining annular rings along each tinged subportion and with helical grooves defining helical ribs along each tinged subportion is exemplified in Gabriel et al. U.S. Pat. No. 5,489,179, supra. The annular grooves have roots defining an imaginary cylinder of a given diameter. The annular rings have crests defining an imaginary cylinder of a larger diameter.

An improved fastener having an elongate shank, an enlarged head at one end of the shank, and a point at the other end of the shank with annular grooves defining annular rings along the shank, with helical grooves defining helical ribs along the shank, and with a polymeric coating on the shank is exemplified in Kish et al. U.S. patent application Ser. No. 08/472,906, supra. The annular grooves have roots defining an imaginary cylinder of a given diameter. The annular rings have crests defining an imaginary cylinder of a smaller diameter.

When such a fastener is made, a problem is encountered if the crests of any of the annular rings near the tip happen to be slightly larger than the crests of any of the annular rings elsewhere along the shank, whereupon the holding capability of the fastener in a metal substrate may be significantly diminished. It can be very difficult to manufacture such a fastener with sufficient precision to avoid the problem.

This invention has resulted from further efforts to improve such a fastener to be primarily useful for fastening a workpiece having a given thickness to a metal substrate having a thinner wall and to be secondarily useful for fastening such a workpiece to a wooden substrate.

Lat et al. U.S. Pat. No. 4,964,774 describes a metal fastener for use in wood construction, having a thermoplastic, predominantly aliphatic polyurethane coating. Nails with this coating are collated in strips not coils, primarily because the coating would create bridging between nails in a coil, and the bridges could not be separated by the nailer during uncoiling.

The inventors are also aware of a pallet nail having a soft acrylic coating. Only a small portion of the nail is coated, in order to reduce the bridging problem. Moreover, the coating is soft and would be stripped off the nail in steel penetration.

SUMMARY OF THE INVENTION

This invention provides a steel fastener having an elongate shank, an enlarged head formed at one end of the shank, and a generally pointed tip formed at the other end of the shank. A grooved portion of the shank is formed with helical grooves defining helical ribs and with annular grooves defining annular rings. The shank may have a cylindrical portion between the grooved portion and the tip and a cylindrical portion between the grooved portion and the head. Each of the annular grooves has a root where deepest and each of the annular rings has a crest where largest.

According to this invention, the roots of the annular grooves define an imaginary cone diverging toward the tip, and the crests of the annular rings define an imaginary cone converging toward the tip. Consequently, the fastener can be easily made without encountering the problem discussed above. Additionally, the fastener functions effectively for fastening a workpiece having a given thickness to a metal substrate having a thinner wall.

Preferably, the shank has an exterior surface coated with one or more protective layers for corrosion resistance. Thus, the exterior surface of the shank may be coated with a polymeric coating. Preferably, the polymeric coating is formed from a mixture containing a water-based acrylic resin and a water-based polyurethane resin. Alternatively, the polymeric coating is a powder coating, which is applied as disclosed in U.S. patent application Ser. No. 08/472,906, supra.

Preferably, the fastener is provided with a zinc layer and a chromate conversion layer between the polymeric coating and the exterior surface of the shank. The polymeric coating provides enhanced lubricity when the fastener is driven into or through a metal substrate. The zinc layer, the chromate conversion layer, and the polymeric coating provide corrosion protection after the fastener has been driven.

These and other objects, features, and advantages of this invention are evident from the following description of a preferred embodiment of this invention with reference to the accompanying drawings.

DETAILED DESCRIPTION OF THE PREFERRED EMBODIMENT

Figure 1:
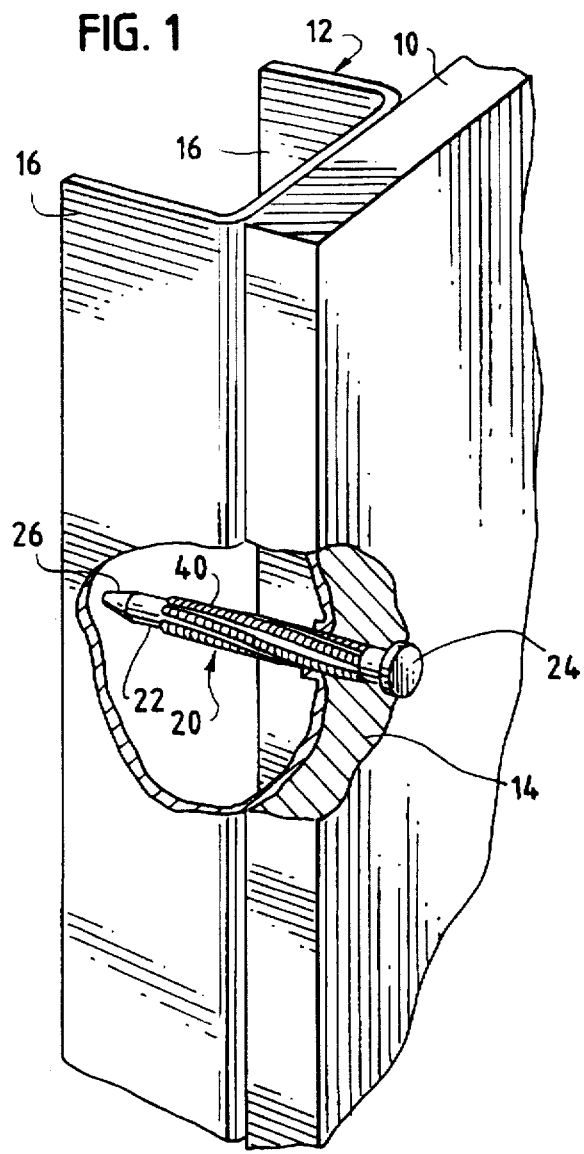
FIG. 1 is a fragmentary, perspective, partly cutaway view of a building assembly comprising a workpiece having a given thickness, namely a board, a metal substrate having a thinner wall, namely a metal framing member, and a fastener constituting a preferred embodiment of this invention.

As shown in FIG. 1, a building assembly comprises a relatively thick board 10, a metal framing member 12 having a relatively thin wall 14 and two relatively thin flanges 16 extending normally from the relatively thin wall 14, and a fastener 20 constituting a preferred embodiment of this invention.

The fastener 20 has an elongate shank 22 defining an axis, an enlarged head 24 formed at one end of the shank 22 and chamfered where the head 24 faces the shank 22, and a generally pointed tip 26 formed at the other end of the shank 22. Preferably, as shown, the tip 26 is frusto-conical except for a rounded end 28.

The board 10 may be made from wood, plywood, oriented strand board, other wood-like materials, cement board, or plasterboard. The framing member 12 may be made from galvanized steel. The fastener 20 may be made from a cylindrical wire of 1030 carbon steel, heat-treated to a core hardness of 40 to 45 Rockwell C and to a surface hardness of 42 to 50 Rockwell C, and coated with one or more protective layers for corrosion resistance, preferably being coated successively with a zinc layer 32, a chromate conversion layer 34, and a polymeric layer 36.

The fastener 20 is coated successively with an inorganic coating comprising the zinc layer 32 and the chromate conversion layer 34 and with an organic layer comprising the polymeric layer 36 by steps similar to steps disclosed in Lat et al. U.S. Pat. No. 4,964,774, the disclosure of which is incorporated herein by reference. The zinc layer 32 and the chromate conversion layer 34 are similar to the zinc and chromate conversion layers disclosed in Lat et al. U.S. Pat. No. 4,964,774.

Preferably, the polymeric layer 36 is formed from an aqueous composition containing a water-based acrylic resin and a water-based polyurethane resin. The aqueous composition is applied to the fastener 30 by steps similar to steps disclosed in Lat et al. U.S. Pat. No. 4,964,774 so as to provide, after drying, a substantially continuous film encasing the shank 22 and the tip 26 of the fastener 30 and having a thickness of about 0.2 mil to about 3 mils, a thickness of about 0.5 mil being preferred. Preferably, the aqueous composition contains a defoamer, such as F & H™ defoamer available from Finnaren & Haley of Conshohocken, Penn. When applied to collated fasteners similar to the fastener 20, the aqueous composition tends to reduce undesirable bridging from fastener to fastener within the collated coil, and any bridging that does occur is very weak so as not to affect the operation of a fastener-driving tool. Optimally, the coating is force-dried at an elevated temperature within 30 seconds, so as to provide desirable film properties.

Particularly suitable are aqueous compositions containing minor amounts of NeoCryl A-550™ aqueous acrylic dispersions and major amounts of NeoRez R-9637™ aqueous, aliphatic, polyurethane dispersions, both of which are available commercially from Zeneca Resins (formerly ICI Resins) of Wilmington, Mass. In one example, the aqueous composition consists essentially of NeoCryl A-550™ aqueous acrylic dispersions in an amount of 3 quarts, NeoRez R-9637™ aqueous, aliphatic, polyurethane dispersions in an amount of 5 quarts, tap water in an amount of 13 quarts, and F & H™ defoamer in an amount of 2.5 cc, and the aqueous composition is mixed for 10 minutes before its application to fasteners similar to the fastener 20.

The polyurethane component of the polymeric coating 36 provides enhanced lubricity when the fastener 20 is driven into or through a metal substrate, such as the wall 14 of the metal framing member 12. The acrylic component of the polymeric coating 36 provides a hard surface, at least a portion of which does not scrape off when the fastener 20 is driven. The resulting polyurethane and acrylic composition produces a fastener coating that does not allow strong bridging between fasteners is a coil but is strong enough to adhere to the fastener during its intended driving into wood and steel. The coating also lubricates the fastener during penetration, for easier driving and less stress on the creation of the hole in the steel. The zinc layer 32, the chromate conversion layer 34, and the polymeric coating 36 provide corrosion protection after the fastener 20 has been driven.

Alternatively, but less preferably because of comparative costs, the polymeric coating 36 may be a powder coating. If the polymeric coating 36 is a powder coating, the powder coating may be applied as disclosed in U.S. patent application Ser. No. 08/472,906, supra.

The shank 22 has a ringed portion 40 formed with a series of annular grooves 42, which define a series of annular rings 44, and with a circumferential array of helical grooves 46, which define a circumferential array of helical ribs 48. Preferably, as shown, the helical grooves 46 are deeper than the annular grooves 42. The shank 22 also has a cylindrical portion between the ringed portion 40 and the head 24 and a cylindrical portion between the ringed portion 40 and the tip 26. Collating wires (not shown) may be conveniently welded to the cylindrical portions 50, 52, for collating the fastener 20 and other, similar fasteners (not shown) into a coil (not shown) in known manner.

Figure 4:
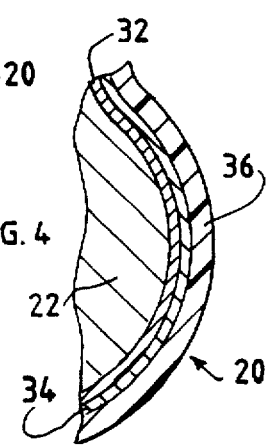
FIG. 4, on a further enlarged scale compared to FIG. 3, is a fragmentary detail of a region indicated by broken lines in FIG. 3.

Each annular groove 42 where deepest has a root 52, which is interrupted by the helical grooves 46 if the helical grooves 46 are deeper, and each annular ring 44 where largest has a crest 54, which is interrupted by the helical grooves 46. In axial profile, as shown in FIG. 4, the annular grooves 46 are rounded at the roots 52 and the annular rings 44 are rounded at the crests 54.

Figure 2:
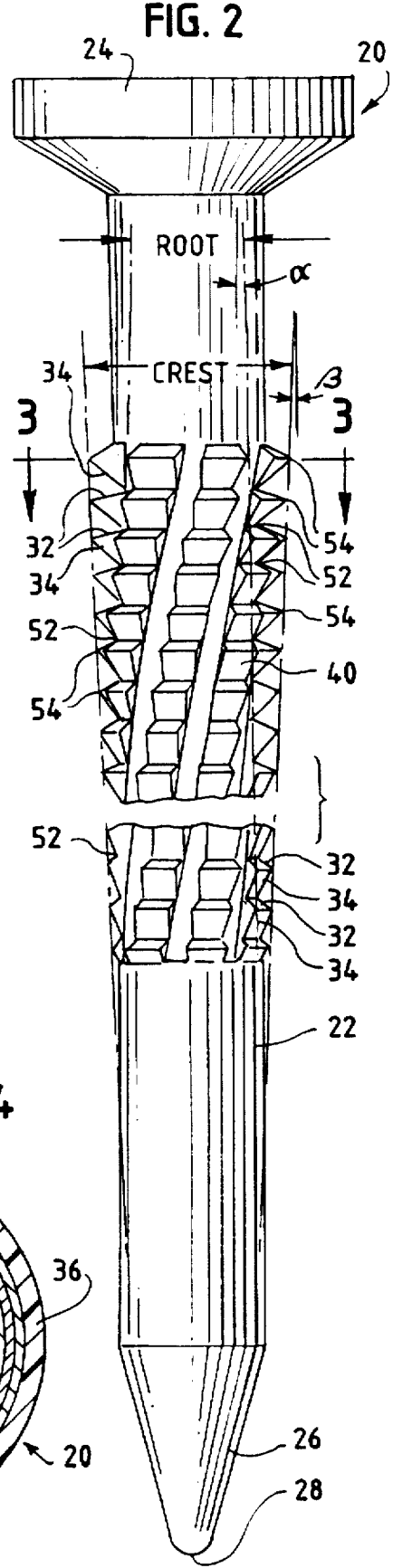
FIG. 2, on an substantially enlarged scale compared to FIG. 1, is a elevational, partly shortened view of the fastener shown in FIG. 1.
Figure 3:
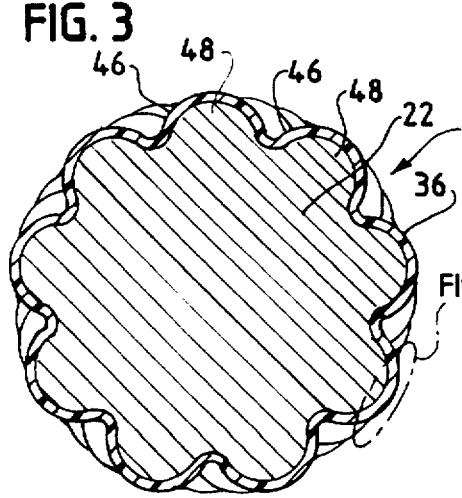
FIG. 3, on a further enlarged scale compared to FIG. 2, is a sectional view taken along line 3—3 of FIG. 2, in a direction indicated by arrows.

As shown in FIG. 2, the roots 52 of the annular grooves 42 define an imaginary cone, which diverges toward the tip 26 and converges toward the head 24 and which defines a small, acute angle α relative to an axially extending line. As shown therein, the crests 54 of the annular rings 44 define an imaginary cone, which diverges toward the head 24 and converges toward the tip 26 and which defines a small, acute angle β relative to an axially extending line. Preferably, the acute angle α equals about −0.1°, and the acute angle β equals about 0.1°.

In an exemplary process for making the fastener 20, a cylindrical wire of 1030 carbon steel is processed in a Wafios™ nail-forming machine so as to form the fastener 20 in a preliminary form with the enlarged head 24 and with the generally pointed tip 26 having the rounded end 28. Next, the fastener 20 in the preliminary form is processed in a Rollmax™ thread-forming machine so as to form the fastener 20 in a final form with the annular grooves 42 defining the annular rings 44 and with the helical grooves 46 defining the helical ribs 48. In one embodiment, the imaginary cones are formed by shimming the dies that form the annular rings 44. It is also contemplated that dies having tapered surfaces cut into them could be used. After being heat treated to a core hardness of 40 to 45 Rockwell C and to a surface hardness of 42 to 50 Rockwell C, the fastener 20 is plated successively with the zinc layer 32 and with the chromate conversion layer 34. Next, the fastener 20 is collated with similar fasteners, as by welding wires to the shanks of the collated fasteners. After being heated, the collated fasteners including the fastener 20 are dipped into the aqueous composition to form the polymeric layer 36, whereupon the collated fasteners including the fastener 20 are heated again to dry the aqueous composition.

As illustrated and described, the shank 22 has a unique configuration, whereby the fastener 20 can be easily made without encountering the problem discussed above. The fastener 20 functions effectively for fastening a workpiece having a given thickness, such as the relatively thick board 10, to a metal substrate having a thinner wall, such as the metal framing member 12 having the relatively thin wall 14. Where the wall 14 is penetrated by the tip 26, a flange 60 is formed, which tends to grip the ringed portion 40 of the fastener 20 tightly.

Although the fastener 20 is designed primarily for fastening a workpiece having a given thickness to a metal substrate having a thinner wall, the fastener 20 may be effectively used to fasten a workpiece to a wooden substrate (not shown) in a secondary use.

Various modifications may be made in the preferred embodiment described above without departing from the scope and spirit of this invention.

We claim:

1. A steel fastener having an elongate shank, an enlarged head formed at one end of the shank, and a generally pointed tip formed at the other end of the shank, the shank having a grooved portion formed with helical grooves defining helical ribs and with annular grooves defining annular rings, wherein each of the annular grooves has a root where deepest, wherein the roots of the annular grooves define an imaginary cone diverging toward the tip, wherein each of the annular rings has a crest where largest, and wherein the crests of the annular rings define an imaginary cone converging toward the tip.

2. The fastener of claim 1 wherein the helical grooves are deeper than the annular grooves.

3. The fastener of claim 1 wherein the shank has a cylindrical portion between the grooved portion and the tip.

4. The fastener of claim 1 wherein the shank has a cylindrical portion between the grooved portion and the head.

5. The fastener of claim 1 wherein the shank has a cylindrical portion between the grooved portion and the tip and a cylindrical portion between the grooved portion and the head.

6. The fastener of claim 5 wherein the helical grooves are deeper than the annular grooves.

7. The fastener of claim 1 wherein the shank has an exterior surface coated with one or more protective layers for corrosion protection.

8. The fastener of claim 1 wherein the shank has an exterior surface coated with a polymeric coating.

9. The fastener of claim 8 wherein the polymeric coating is formed from an aqueous composition containing a water-based acrylic resin and a water-based polyurethane resin.

10. The fastener of claim 9 wherein the fastener is provided with a zinc layer and a chromate conversion layer between the polymeric coating and the exterior surface of the shank.

11. The fastener of claim 8 herein the polymeric coating is a powder coating.

12. The fastener of claim 11 wherein the fastener is provided with a zinc layer and a chromate conversion layer between the polymeric coating and the exterior surface of the shank.

* * * * *